US010650332B1

(12) United States Patent
Sinha et al.

(10) Patent No.: US 10,650,332 B1
(45) Date of Patent: *May 12, 2020

(54) BUYER-PROVIDER MATCHING ALGORITHM

(75) Inventors: Ved Ranjan Sinha, Menlo Park, CA (US); Sunny SunMin Song, Los Altos, CA (US); Harish Bal Kotbagi, Foster City, CA (US)

(73) Assignee: Elance, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/476,039

(22) Filed: Jun. 1, 2009

(51) Int. Cl.
| | |
|---|---|
| *G06F 7/00* | (2006.01) |
| *G06Q 10/06* | (2012.01) |
| *G06F 17/30* | (2006.01) |
| *G06Q 30/02* | (2012.01) |
| *G06F 16/2457* | (2019.01) |

(52) U.S. Cl.
CPC ..... *G06Q 10/063* (2013.01); *G06F 16/24578* (2019.01); *G06Q 10/063112* (2013.01); *G06Q 30/02* (2013.01)

(58) Field of Classification Search
USPC .......................................................... 705/26
See application file for complete search history.

(56) References Cited

U.S. PATENT DOCUMENTS

| | | |
|---|---|---|
| 4,703,325 A | 10/1987 | Chamberlin et al. |
| 4,799,156 A | 1/1989 | Shavit et al. |
| 5,008,853 A | 4/1991 | Bly et al. |
| 5,220,657 A | 6/1993 | Bly et al. |
| 5,548,506 A | 8/1996 | Srinivasan |
| 5,557,515 A | 9/1996 | Abbruzzese et al. |
| 5,592,620 A | 1/1997 | Chen et al. |

(Continued)

FOREIGN PATENT DOCUMENTS

| | | |
|---|---|---|
| EP | 0 952 536 A1 | 10/1999 |
| WO | WO 01/15050 A1 | 3/2001 |

(Continued)

OTHER PUBLICATIONS

U.S. Appl. No. 09/644,665, filed Aug. 24, 2000, Sheth et al.

(Continued)

*Primary Examiner* — Talia F Crawley
(74) *Attorney, Agent, or Firm* — Haverstock & Owens LLP

(57) ABSTRACT

In a services exchange medium, buyers are able to search and hire service providers to get projects done quickly and cost effectively. A buyer-provider matching algorithm uses two scores to calculate a "Provider Search" score for each service provider: a "Reputation" score and a "Provider Match" score. In some embodiments, the "Reputation" score is a quantitative metric score of a service provider's overall reputation within the services exchange medium. In other embodiments, the "Reputation" score is configured to enhance the "Provider Match" score. Since reputation is an important attribute when searching for a qualified service provider, the "Provider Search" score takes into consideration the "Reputation" score. A provider results list generated from a provider search is sorted by the "Provider Search" score. As such, the provider results list is sorted in a significant manner useful to the buyer searching for the qualified service provider.

36 Claims, 6 Drawing Sheets

| | Provider Profile | Absolute Weight | First Hit | Secondary Hits Magnifier | Secondary N Hits Count | Total Secondary Hit Score | Total Score | Calculated Weight |
|---|---|---|---|---|---|---|---|---|
| 105 | 1. Provider Tagline | 100 | 1 | 0 | 0 | 0 | 1 | 100 |
| 110 | 2. Provider User ID | 15 | 0 | 0 | 0 | 0 | 0 | 0 |
| 115 | 3. Provider Name | 75 | 0 | 0 | 0 | 0 | 0 | 0 |
| 120 | 4. Summary Service Description | 75 | 0 | 0 | 0 | 0 | 0 | 0 |
| 125 | 5. Service Tags/Keywords | 75 | 1 | 0 | 0 | 0 | 1 | 75 |
| 130 | 6. Skills | 75 | 0 | 0 | 0 | 0 | 0 | 0 |
| 135 | 7. About Us | 25 | 0 | 0 | 0 | 0 | 0 | 0 |
| 140 | 8. Detailed Service Description | 50 | 1 | 0 | 2 | 0 | 1 | 50 |
| 145 | 9. Provider Credentials | 25 | 0 | 0 | 0 | 0 | 0 | 0 |
| 150 | 10. Experience | 25 | 0 | 0 | 0 | 0 | 0 | 0 |
| 155 | 11. Provider Primary Location | 0 | 0 | 0 | 0 | 0 | 0 | 0 |

(56) References Cited

U.S. PATENT DOCUMENTS

| | | |
|---|---|---|
| 5,664,115 A | 9/1997 | Fraser |
| 5,715,402 A | 2/1998 | Popolo |
| 5,732,400 A | 3/1998 | Mandler et al. |
| 5,794,207 A | 8/1998 | Walker et al. |
| 5,835,896 A | 11/1998 | Fisher et al. |
| 5,842,178 A | 11/1998 | Giovannoli |
| 5,862,223 A | 1/1999 | Walker et al. |
| 5,905,975 A | 5/1999 | Ausubel |
| 5,924,082 A | 7/1999 | Silverman et al. |
| 5,949,976 A | 9/1999 | Chappelle |
| 5,956,715 A | 9/1999 | Glasser et al. |
| 5,966,130 A | 10/1999 | Benman, Jr. |
| 5,987,498 A | 11/1999 | Athing et al. |
| 6,009,154 A | 12/1999 | Rieken et al. |
| 6,041,307 A | 3/2000 | Ahuja et al. |
| 6,049,777 A | 4/2000 | Sheena et al. |
| 6,061,665 A | 5/2000 | Bahreman |
| 6,064,980 A | 5/2000 | Jacobi et al. |
| 6,078,906 A | 6/2000 | Huberman |
| 6,092,049 A * | 7/2000 | Chislenko ............. G06Q 30/02 705/7.29 |
| 6,101,482 A | 8/2000 | DiAngelo et al. |
| 6,119,101 A | 9/2000 | Peckover |
| 6,119,149 A | 9/2000 | Notani |
| 6,128,624 A | 10/2000 | Papierniak et al. |
| 6,141,653 A | 10/2000 | Conklin et al. |
| 6,154,731 A | 11/2000 | Monks et al. |
| 6,161,099 A | 12/2000 | Harrington et al. |
| 6,208,659 B1 | 3/2001 | Govindarajan et al. |
| 6,223,177 B1 | 4/2001 | Tatham et al. |
| 6,226,031 B1 | 5/2001 | Barraclough et al. |
| 6,233,600 B1 | 5/2001 | Salas et al. |
| 6,311,178 B1 | 10/2001 | Bi et al. |
| 6,336,105 B1 | 1/2002 | Conklin et al. |
| 6,374,292 B1 | 4/2002 | Srivastava et al. |
| 6,385,620 B1 | 5/2002 | Kurziua |
| 6,415,270 B1 | 7/2002 | Rackson et al. |
| 6,415,284 B1 | 7/2002 | D'Souza et al. |
| 6,442,528 B1 | 8/2002 | Notani et al. |
| 6,484,153 B1 | 11/2002 | Walker et al. |
| 6,557,035 B1 | 4/2003 | McKnight |
| 6,564,246 B1 | 5/2003 | Varma et al. |
| 6,567,784 B2 | 5/2003 | Bukow |
| 6,598,026 B1 | 7/2003 | Ojha et al. |
| 6,618,734 B1 | 9/2003 | Williams |
| 6,662,194 B1 | 12/2003 | Joao |
| 6,735,570 B1 | 5/2004 | Lacy et al. |
| 6,832,176 B2 | 12/2004 | Hartigan et al. |
| 6,859,523 B1 | 2/2005 | Jilk |
| 6,871,181 B2 * | 3/2005 | Kansal ............... G06Q 10/0639 705/4 |
| 6,931,385 B1 | 8/2005 | Halstead et al. |
| 6,938,048 B1 | 8/2005 | Jilk et al. |
| 7,069,242 B1 | 6/2006 | Sheth et al. |
| 7,096,193 B1 | 8/2006 | Beaudoin |
| 7,155,400 B1 | 12/2006 | Jilk et al. |
| 7,310,415 B1 | 12/2007 | Short |
| 7,346,535 B2 | 3/2008 | Younger |
| 7,406,443 B1 | 7/2008 | Fink et al. |
| 7,437,327 B2 | 10/2008 | Lam et al. |
| 7,444,374 B1 | 10/2008 | Baker |
| 7,466,810 B1 | 12/2008 | Quon |
| 7,505,919 B2 | 3/2009 | Richardson |
| 7,587,336 B1 | 9/2009 | Wallgren et al. |
| 7,752,080 B1 | 7/2010 | Greener |
| 7,778,938 B2 | 8/2010 | Stimac |
| 7,814,085 B1 * | 10/2010 | Pfleger ................. G06F 16/951 707/708 |
| 7,966,265 B2 | 6/2011 | Schalk et al. |
| 8,024,225 B1 | 9/2011 | Sirota et al. |
| 8,024,670 B1 | 9/2011 | Rahmatian |
| 8,156,051 B1 | 4/2012 | Shah |
| 8,224,755 B2 | 7/2012 | Goodman et al. |
| 8,380,709 B1 * | 2/2013 | Diller ................ G06F 16/24578 707/723 |
| 8,504,403 B2 | 8/2013 | Deich |
| 8,512,143 B2 | 8/2013 | Jung et al. |
| 8,517,742 B1 | 8/2013 | Johnson |
| 8,682,683 B2 | 3/2014 | Ananian |
| 8,700,694 B2 | 4/2014 | Archbold |
| 8,843,388 B1 | 9/2014 | Westfall |
| 8,856,670 B1 | 10/2014 | Thakur et al. |
| 9,020,271 B2 | 4/2015 | Deolalikar et al. |
| 9,454,576 B1 | 9/2016 | Kapoor |
| 2001/0011222 A1 | 8/2001 | McLauchlin et al. |
| 2001/0032170 A1 | 10/2001 | Sheth |
| 2001/0034630 A1 | 10/2001 | Mayer |
| 2001/0034688 A1 | 10/2001 | Annunziata |
| 2001/0039508 A1 * | 11/2001 | Nagler ........... G06Q 10/063112 705/7.14 |
| 2001/0041988 A1 | 11/2001 | Lin |
| 2002/0007300 A1 | 1/2002 | Slatter |
| 2002/0010685 A1 | 1/2002 | Ashby |
| 2002/0023046 A1 | 2/2002 | Callahan et al. |
| 2002/0026398 A1 | 2/2002 | Sheth |
| 2002/0032576 A1 | 3/2002 | Abbott et al. |
| 2002/0052773 A1 | 5/2002 | Kraemer |
| 2002/0054138 A1 | 5/2002 | Hennum |
| 2002/0069031 A1 | 6/2002 | Lehman |
| 2002/0078432 A1 | 6/2002 | Charisius et al. |
| 2002/0103687 A1 | 8/2002 | Kipling |
| 2002/0120522 A1 | 8/2002 | Yang |
| 2002/0120554 A1 | 8/2002 | Vega |
| 2002/0129139 A1 | 9/2002 | Ramesh |
| 2002/0133365 A1 | 9/2002 | Grey et al. |
| 2002/0161707 A1 | 10/2002 | Cole et al. |
| 2002/0194077 A1 | 12/2002 | Dutta |
| 2002/0194112 A1 | 12/2002 | dePinto et al. |
| 2003/0004738 A1 | 1/2003 | Chander |
| 2003/0014294 A1 | 1/2003 | Yoneyama |
| 2003/0046155 A1 | 3/2003 | Himmel et al. |
| 2003/0050811 A1 | 3/2003 | Freeman, Jr. |
| 2003/0055780 A1 | 3/2003 | Hansen et al. |
| 2003/0061266 A1 | 3/2003 | Ouchi |
| 2003/0086608 A1 | 5/2003 | Frost |
| 2003/0101126 A1 | 5/2003 | Cheung et al. |
| 2003/0120603 A1 | 6/2003 | Kojima et al. |
| 2003/0182171 A1 | 9/2003 | Vianello |
| 2003/0191684 A1 | 10/2003 | Lumsden |
| 2003/0212246 A1 | 11/2003 | Eleveld |
| 2003/0212627 A1 | 11/2003 | Burns et al. |
| 2003/0220843 A1 | 11/2003 | Lam et al. |
| 2003/0233372 A1 | 12/2003 | Warner |
| 2004/0063463 A1 | 4/2004 | Boivin |
| 2004/0103167 A1 | 5/2004 | Grooters et al. |
| 2004/0122926 A1 | 6/2004 | Moore et al. |
| 2004/0128224 A1 | 7/2004 | Dabney et al. |
| 2004/0215560 A1 | 10/2004 | Amalraj et al. |
| 2004/0230466 A1 | 11/2004 | Davis et al. |
| 2004/0230511 A1 | 11/2004 | Kannan et al. |
| 2004/0230521 A1 | 11/2004 | Broadbent et al. |
| 2004/0241627 A1 | 12/2004 | Delfing |
| 2004/0243428 A1 | 12/2004 | Black |
| 2005/0033633 A1 | 2/2005 | LaPasta |
| 2005/0043998 A1 | 2/2005 | Bross et al. |
| 2005/0097613 A1 | 5/2005 | Ulate et al. |
| 2005/0131830 A1 | 6/2005 | Juarez et al. |
| 2005/0177380 A1 | 8/2005 | Pritchard et al. |
| 2005/0222907 A1 | 10/2005 | Pupo |
| 2006/0031177 A1 | 2/2006 | Rule |
| 2006/0074708 A1 | 4/2006 | Woods |
| 2006/0080116 A1 | 4/2006 | Maguire |
| 2006/0095366 A1 | 5/2006 | Sheth et al. |
| 2006/0106846 A1 | 5/2006 | Schulz |
| 2006/0122850 A1 | 6/2006 | Ward et al. |
| 2006/0136324 A1 | 6/2006 | Barry et al. |
| 2006/0143228 A1 | 6/2006 | Odio-Paez |
| 2006/0155609 A1 | 7/2006 | Caiafa |
| 2006/0159109 A1 | 7/2006 | Lamkin |
| 2006/0177041 A1 | 8/2006 | Warner et al. |
| 2006/0195428 A1 | 8/2006 | Peckover |
| 2006/0212359 A1 * | 9/2006 | Hudgeon ............ G06Q 10/063 705/7.11 |
| 2006/0284838 A1 | 12/2006 | Tsatalos |

(56) References Cited

U.S. PATENT DOCUMENTS

| | | |
|---|---|---|
| 2007/0005536 A1 | 1/2007 | Caswell et al. |
| 2007/0022040 A1 | 1/2007 | Gordon |
| 2007/0027746 A1 | 2/2007 | Grabowich |
| 2007/0027792 A1 | 2/2007 | Smith |
| 2007/0061144 A1 | 3/2007 | Grichnik et al. |
| 2007/0067196 A1 | 3/2007 | Usui |
| 2007/0078699 A1 | 4/2007 | Scott et al. |
| 2007/0088601 A1 | 4/2007 | Money et al. |
| 2007/0112671 A1 | 5/2007 | Rowan |
| 2007/0130059 A1 | 6/2007 | Lee et al. |
| 2007/0162379 A1 | 7/2007 | Skinner |
| 2007/0174180 A1 | 7/2007 | Shin |
| 2007/0174394 A1 | 7/2007 | Jayaweera |
| 2007/0185723 A1 | 8/2007 | Shellnutt |
| 2007/0192130 A1* | 8/2007 | Sandhu ............... G06Q 10/1053 705/321 |
| 2007/0233510 A1 | 10/2007 | Howes |
| 2008/0010598 A1 | 1/2008 | Smilowitz et al. |
| 2008/0046834 A1 | 2/2008 | Yu et al. |
| 2008/0059267 A1 | 3/2008 | Hamilton |
| 2008/0059523 A1 | 3/2008 | Schmidt |
| 2008/0065444 A1 | 3/2008 | Stroman et al. |
| 2008/0082662 A1 | 4/2008 | Dandliker et al. |
| 2008/0091774 A1 | 4/2008 | Taylor et al. |
| 2008/0104495 A1 | 5/2008 | Craig |
| 2008/0109491 A1 | 5/2008 | Gupta |
| 2008/0134292 A1 | 6/2008 | Ariel et al. |
| 2008/0154783 A1 | 6/2008 | Rule et al. |
| 2008/0184135 A1 | 7/2008 | Washburn et al. |
| 2008/0187114 A1 | 8/2008 | Altberg |
| 2008/0194228 A1 | 8/2008 | Pousti |
| 2008/0209417 A1 | 8/2008 | Jackobson |
| 2008/0244582 A1 | 10/2008 | Brown et al. |
| 2008/0288582 A1 | 11/2008 | Pousti |
| 2008/0294505 A1 | 11/2008 | Markowitz et al. |
| 2008/0294631 A1 | 11/2008 | Malhas et al. |
| 2008/0294688 A1 | 11/2008 | Brousard |
| 2008/0313005 A1 | 12/2008 | Nessland et al. |
| 2009/0011395 A1 | 1/2009 | Schmidt |
| 2009/0017788 A1 | 1/2009 | Doyle et al. |
| 2009/0055404 A1 | 2/2009 | Heiden |
| 2009/0055476 A1 | 2/2009 | Marcus et al. |
| 2009/0112728 A1 | 4/2009 | Evers et al. |
| 2009/0116403 A1 | 5/2009 | Callanan et al. |
| 2009/0132345 A1 | 5/2009 | Meyssami et al. |
| 2009/0150386 A1 | 6/2009 | Lichtblau |
| 2009/0177691 A1 | 7/2009 | Manfredi et al. |
| 2009/0199185 A1 | 8/2009 | Slawson et al. |
| 2009/0210282 A1 | 8/2009 | Elenbaas et al. |
| 2009/0234706 A1 | 9/2009 | Adams et al. |
| 2009/0241035 A1 | 9/2009 | Tseng et al. |
| 2009/0241172 A1 | 9/2009 | Sennett et al. |
| 2009/0249340 A1 | 10/2009 | Akiyama et al. |
| 2009/0265243 A1 | 10/2009 | Karassner |
| 2009/0287592 A1 | 11/2009 | Brooks et al. |
| 2009/0288021 A1 | 11/2009 | Ioffe et al. |
| 2009/0327081 A1 | 12/2009 | Wang et al. |
| 2010/0017253 A1 | 1/2010 | Butler |
| 2010/0088749 A1 | 4/2010 | Steeples |
| 2010/0115040 A1 | 5/2010 | Sargent et al. |
| 2010/0144318 A1 | 6/2010 | Cable |
| 2010/0161503 A1 | 6/2010 | Foster |
| 2010/0162167 A1 | 6/2010 | Stallings |
| 2010/0191591 A1 | 7/2010 | Silbert |
| 2010/0250322 A1 | 9/2010 | Norwood |
| 2010/0287525 A1 | 11/2010 | Wagner |
| 2010/0324948 A1 | 12/2010 | Kumar et al. |
| 2011/0106762 A1 | 5/2011 | Dane |
| 2011/0107088 A1 | 5/2011 | Eng et al. |
| 2011/0131146 A1 | 6/2011 | Skutnik |
| 2011/0208665 A1 | 8/2011 | Hirsch |
| 2011/0238505 A1 | 9/2011 | Chiang et al. |
| 2011/0238768 A1 | 9/2011 | Habets et al. |
| 2011/0302053 A1* | 12/2011 | Rigole ................. G06Q 10/087 705/26.41 |
| 2012/0041832 A1 | 2/2012 | Sheth et al. |
| 2012/0110087 A1 | 5/2012 | Culver et al. |
| 2012/0143952 A1 | 6/2012 | Von Graf |
| 2012/0150761 A1 | 6/2012 | Ananian |
| 2013/0246294 A1 | 9/2013 | Pendyala et al. |
| 2013/0325734 A1 | 12/2013 | Bixler et al. |
| 2014/0074738 A1 | 3/2014 | Thankappan et al. |
| 2014/0108078 A1 | 4/2014 | Davis |
| 2014/0164271 A1 | 6/2014 | Forman et al. |
| 2014/0222493 A1 | 8/2014 | Mohan et al. |
| 2014/0358646 A1 | 12/2014 | Said et al. |
| 2014/0377723 A1 | 12/2014 | Strong |
| 2015/0032654 A1 | 1/2015 | Huff |
| 2015/0134600 A1 | 5/2015 | Eisner et al. |
| 2016/0012135 A1 | 1/2016 | Wang et al. |

FOREIGN PATENT DOCUMENTS

| | | |
|---|---|---|
| WO | WO 01/73645 A1 | 10/2001 |
| WO | WO 02/061531 A2 | 8/2002 |

OTHER PUBLICATIONS

U.S. Appl. No. 12/287,994, filed Oct. 14, 2008, Diller et al.
U.S. Appl. No. 12/287,997, filed Oct. 14, 2008, Diller et al.
U.S. Appl. No. 12/474,127, filed May 28, 2008, Diller et al.
U.S. Appl. No. 12/474,147, filed May 28, 2008, Sinha et al.
ants.com web pages [online]. Ants.com [retrieved on Aug. 22, 2008]. Retrieved from the Internet: <URL: http://www.ants.com/ants/>.
bizbuyer.com web pages [online]. BizBuyer.com, [retrieved Aug. 18-21, 2000]. Retrieved from the Internet: <URL: http://www.bizbuyer.com/>.
BullhornPro web pages [online]. Bullhorn, Inc. [retrieved on Jan. 4, 2001]. Retrieved from the Internet: <URL: http://www.bullhornpro.com/>.
Cassidy, M., "Going for Broke," San Jose Mercury News, Monday, Aug. 16, 1999, pp. 1E and 4E, published in San Jose, CA.
efrenzy.com web pages [online]. eFrenzy, Inc. [retrieved on Aug. 22, 2000]. Retrieved from the Internet: <URL: http://www.efrenzy.com/index.isp>.
Eisenberg, D., "We're for Hire, Just Click," Time Magazine, Aug. 16, 1999, vol. 154, No. 7 [online] [retrieved on Aug. 19, 1999]. Retrieved from the Internet: <URL: http://www.pathfinder.com/time/magazine/articles/0,3266,29393,00.html>.
eworkexchange.com web pages [online]. eWork Exchange, Inc. [retrieved on Aug. 18-22, 2000]. Retrieved from the Internet: <URL: http://www.eworks.com/>.
eWork Exchange web pages [online]. eWork Exchange, Inc. [retrieved on Jan. 5, 2001]. Retrieved from the Internet: <URL: http://www.eworks.com/>.
eWork ProSource web pages [online]. eWork Exchange, Inc. [retrieved on Jan. 3, 2001]. Retrieved from the Internet: <URL: http://www.ework.com/>.
FeeBid.com web pages [online]. FeeBid.com [retrieved on Dec. 18, 2000]. Retrieved from the Internet: <URL: http://www.feebid.com>.
freeagent.com web pages [online]. FreeAgent.com [retrieved Aug. 18-22, 2000]. Retrieved from the Internet: <URL: http://www.freeagent.com/>.
guru.com.com web pages [online]. Guru.com, Inc. [retrieved Aug. 18, 2000]. Retrieved from the Internet: <URL: http://www.guru.com/>.
Herhold, S., "Expert Advice is Collectible for Start-up," San Jose Mercury News, Monday, Aug. 16, 1999, pp. 1E and 6E, San Jose, CA.
hotdispatch.com web pages [online]. HotDispatch, Inc. [retrieved on Aug. 22, 2000]. Retrieved from the Internet: <URL: http://www.hotdispatch.com/>.
Humphreys, Paul et al., "A Just-in-Time Evaluation Strategy for International Procurement," MCB UP Limited, 1998, pp. 1-11.
"IBNL Forges Into the Future of Buying and Selling with Source Interactive Software," PR Newswire, Jan. 10, 1996. [replacement copy retrieved on May 4, 2009]. Retrieved from Internet: <URL: http://www.highbeam.com>.

(56) References Cited

OTHER PUBLICATIONS imandi.com web pages [online]. Imandi Corporation [retrieved on Aug. 22, 2000]. Retrieved from the Internet: <URL: http://www.imandi.com/>.
Malone, Thomas W. et al., "The Dawn of the E-Lance Economy," Harvard Business Review, Sep.-Oct. 1998, pp. 145-152.
"Netscape Selects Netopia as the Exclusive 'Virtual Office' Offering on the New Netscape Small Business Source Service," PR Newswire, May 11, 1998, Mountain View and Alameda, California.
onvia.com web pages [online]. Onvia.com [retrieved Aug. 22, 2000]. Retrieved from the Internet: <URL: http://www.onvia.com/usa/home/index.cfm>.
Opus360 web pages [online]. Opus360 Corporation [retrieved on Jan. 3, 2001] Retrieved from the Internet: <URL: http://www.opus360com/>.
smarterwork.com web pges [online]. smarterwork.com, Inc. [retrieved on Aug. 22, 2000]. Retrieved from the Internet: <URL: http://www.smarterwork.com/>.
workexchange.com web pages [online]. WorkExchange, Inc. [retrieved Aug. 22, 2000]. Retrieved from the Internet: <URL: http://www.workexchange.com/unique/workexchange/index1.cfm>.
U.S. Appl. No. 12/474,170, filed May 28, 2008, Sinha et al.
U.S. Appl. No. 60/206,203, filed May 22, 2000, Anumolu et al.
U.S. Appl. No. 60/999,147, filed Oct. 15, 2007, Diller et al.
U.S. Appl. No. 61/131,920, filed Jun. 11, 2008, Diller et al.
Davenport, Thomas H. and Keri Pearlson, "Two Cheers for the Virtual Office", summer 1998, abstract, retrieved from the Internet: <URL: http://www.pubservice.com/MSStore?ProductDetails.aspx?CPC=3944>.
PCT International Search Report and Written Opinion, PCT/US06/22734, dated Jun. 3, 2008, 5 pages.
Shalil Majithia et al, "Reputation-based Semantic Service Discovery", IEEE Computer Society,13th IEEE International Workshops on Enabling Technologies:Infrastructure for Collaborative Enterprises, 2004, pp. 1-6.
Ziqiang Xu et al, "Reputation-Enhanced QoS-based Web Services Discovery", School of Computing, Queen's University, Canada, 2007, pp. 1-8.
Massimo Paolucci et al. "Semantic Matching of Web Services Capabilities" Carnegie Mellon University, 2002, Springer-Verlag Berlin Heidelberg, p. 333-347.
madbid.com [online] <URL: http://web.archive.org.web/20080829025830//http://uk.nadbid.com/faq/>.
morebusiness.com, "How to Write Winning Business Proposals: Writing Strategies," cited in Office Action dated Oct. 6, 2011, <http://www.morebusiness.com/running_your_business/management/v1n11.brc>, published Aug. 1, 1998.
University of Wisconsin—Eau Claire LTS Online Help Documentation, Microsoft Excel 2003/2004, using the Sort Command, https://web.archive.org/web/20080311184836/http://www.uwec.edu/Help/Excel03/srtcom.htm,Mar. 11, 2008,retrieved Oct. 1, 2014.
Paolucci et al., "Semantic Matching of Web Services Capabilities", 2002, Carnegie Mellon University, Pittsburgh, PA, USA.
Muhl, Charles J. "What Is an Employee-The Answer Depends on the Federal Law." Monthly Lab. Rev. 125(2002): 9 pages.
Barton, Lisa Horwedel "Reconciling the independent contractor versus employee dilemma: a discussion of current developments as they relate to employee benefit plans." Cap. UL Rev 29 (2001): 63 pages.
Moran, Jenna Amato "Independent Contractor or Employee-Misclassification of Workers and Its Effect of the State." Buff. Pub. Int. LJ 28 (2009): 28 pages.
Webb, Teresa J., et al. "An empirical assist in resolving the classification dilemma of workers as either employees or independent contractors." Journal of Applied Business Research (JABR) 24. (2011): 22 pages.
Wood, Robert W. "Defining Employees and Independent Contractors." Bus. L. Today 17 (2007): 6 pages.
IBM Websphere Telecommunications Web Services Server Programming Guide, ibm.com/redbooks, John Bergland et al., Sep. 2008.

\* cited by examiner

| Frequency | Score |
|---|---|
| 1 | 50 |
| 2 | 95 |
| 3 | 135 |
| 4 | 170 |
| 5 | 200 |
| 6 | 225 |
| 7 | 245 |
| 8 | 260 |
| 9 | 270 |
| 10 | 275 |

| Area | Frequency | Points | E Score | Final Score |
|---|---|---|---|---|
| Detailed Service Description | 3 | 50 | 1.11 | 55.5 |
| Service Tags/Keywords | 1 | 75 | 1.11 | 83.25 |
| Provider Tagline | 1 | 100 | 1.11 | 111 |
| Past Project Description | 5 | 200 | 1.11 | 222 |
| Past Project Name | 8 | 660 | 1.11 | 732.6 |

Fig. 5

BUYER-PROVIDER MATCHING ALGORITHM

FIELD OF THE INVENTION

The present invention relates to matching algorithms. More particularly, the present invention relates to a buyer-provider matching algorithm.

BACKGROUND OF THE INVENTION

Many job sites that provide a community for job providers and job seekers contain a wealth of resources for both the job providers and the job seekers. However, prior art job sites suffer from a number of shortcomings. For example, a job site that returns a provider search result listing job seekers alphabetically by name presents an inconvenience for a job provider, because the provider search result has insignificant value in terms of finding a qualified job seeker. The provider search result listing job seekers based only on a keyword match also presents an inconvenience for the job provider, because the provider search result does not take into consideration of other important attributes, such as how well a job seeker is regarded in the community. For example, the job seeker having a proper education and qualifications may not work well with others or may not have good work ethics. The provider search result based only on the keyword match do not reflect such attributes. As such, the ability to organize data properly and return the data in a significant manner is important.

The present invention addresses at least these limitations in the prior art.

SUMMARY OF THE INVENTION

An object of the present invention is to provide a buyer-provider matching algorithm within a services exchange medium. In the services exchange medium, buyers find and hire service providers "on demand" to get projects done quickly and cost effectively.

In one aspect, a computerized method of generating a provider results list comprises calculating a provider search score for each service provider within a services exchange medium and sorting the provider results list based on the provider search score. The provider search score is a sum of at least one provider match score enhanced by a reputation score. The provider search score is stored on a computing device. The reputation score in some embodiments is dependent on at least one of customer satisfaction, earnings, and participation by a service provider within the services exchange medium. A provider match score in some embodiments is based on at least one of match between a search text and a section of a profile, and match between a the search text and a part of a project completed by the service provider. In some embodiments, the section of the profile is a provider tagline section, a provider user ID section, a provider name section, a summary services description section, a keywords section, a skills section, an about us section, a detailed services exchange section, a credentials section, or an experience section. A number of points for a match between the search text and the section of the profile comprises a first hit value and a total secondary hit score. The calculating comprises adjusting the total secondary hit score by a secondary hits magnifier. The secondary hits magnifier is modifiable. The calculating further comprises adding the first hit value and the total secondary hit score together, and multiplying an absolute weight to a sum of the first hit value and the total secondary hit score. The absolute weight is modifiable. In some embodiments, the part of the project is a project name or a project description. A number of points associated with a match between the search text and the project name is modifiable. A number of points associated with a match between the search text and the project description is modifiable.

In another aspect, a provider search method within a services exchange medium comprises obtaining a search text, calculating a first score based on a reputation of a service provider, computing a plurality of second scores based on matches between the search text and service provider data, determining a third score based on the plurality of second scores enhanced by the first score, wherein the third score is stored on a computing device, repeating steps calculating, computing, determining for all service providers within the services exchange medium, and generating a provider results list. Typically, the provider results list is sorted by the third score. The reputation in some embodiments is dependent on at least one of customer satisfaction, earnings, and participation by the service provider within the services exchange medium. The method in some embodiments further comprises comparing the search text with sections of a profile belonging to the service provider, and checking the search text against parts of an at least one project completed by the service provider. The sections include provider tagline section, a provider user ID section, a provider name section, a summary services description section, a keywords section, a skills section, an about us section, a detailed services exchange section, a credentials section, and an experience section. The parts include a project name and a project description. A number of points for a match between the search text and a section of the profile comprises a first hit value and a total secondary hit score. The comparing comprises adjusting the total secondary hit score by a secondary hits magnifier. The secondary hits magnifier is modifiable. The comparing further comprises adding the first hit score and the total secondary hit score together, and multiplying an absolute weight to a sum of the first hit value and the total secondary hit score. The absolute weight is modifiable. A number of points for a match frequency between the search text and the project name is modifiable. A score for a match frequency between the search text and the project description is modifiable.

Yet, in another aspect, a system for creating portable interactive windows comprises a processor and an application executed by the processor. The application is for calculating a provider search score for each service provider within a services exchange medium and sorting the provider results list based on the provider search score. The provider search score is a sum of at least one provider match score enhanced by a reputation score. The reputation score in some embodiments is dependent on at least one of customer satisfaction, earnings, and participation by a service provider within the services exchange medium. A provider match score in some embodiments is based on at least one of match between a search text and a section of a profile, and match between a the search text and a part of a project completed by the service provider. In some embodiments, the section of the profile is a provider tagline section, a provider user ID section, a provider name section, a summary services description section, a keywords section, a skills section, an about us section, a detailed services exchange section, a credentials section, or an experience section. A number of points for a match between the search text and the section of the profile comprises a first hit value and a total secondary hit score. The calculating comprises adjusting the total secondary hit score by a secondary hits magnifier. The secondary hits magnifier is modifiable. The calculating further comprises adding the first hit value and the total secondary hit score together, and multiplying an absolute weight to a sum of the first hit value and the total secondary hit score. The absolute weight is modifiable. In some embodiments, the part of the project is a project name or a project description. A number of points associated with a match between the search text and the project name is modifiable. A number of points associated with a match between the search text and the project description is modifiable.

Yet, in another aspect, a computerized method of enhancing provider match scores comprises determining a first match score for each section of a profile stored on a computing device, determining a second match score based on a number of matches between a search text and a project title of each project completed by a service provider, and determining a third match score based on a number of matches between the search text and a project description of each project completed by the service provider. The method also includes adding together first match scores, the second match score, and the third match score to obtain a total match score. The method further includes multiplying an enhancement value to the total match score, the enhancement value is dependent on reputation of the service provider

BRIEF DESCRIPTION OF THE DRAWINGS

FIG. 5 illustrates an exemplary provider results list in accordance with some embodiments of the present invention.

DETAILED DESCRIPTION OF THE INVENTION

Figure 1:
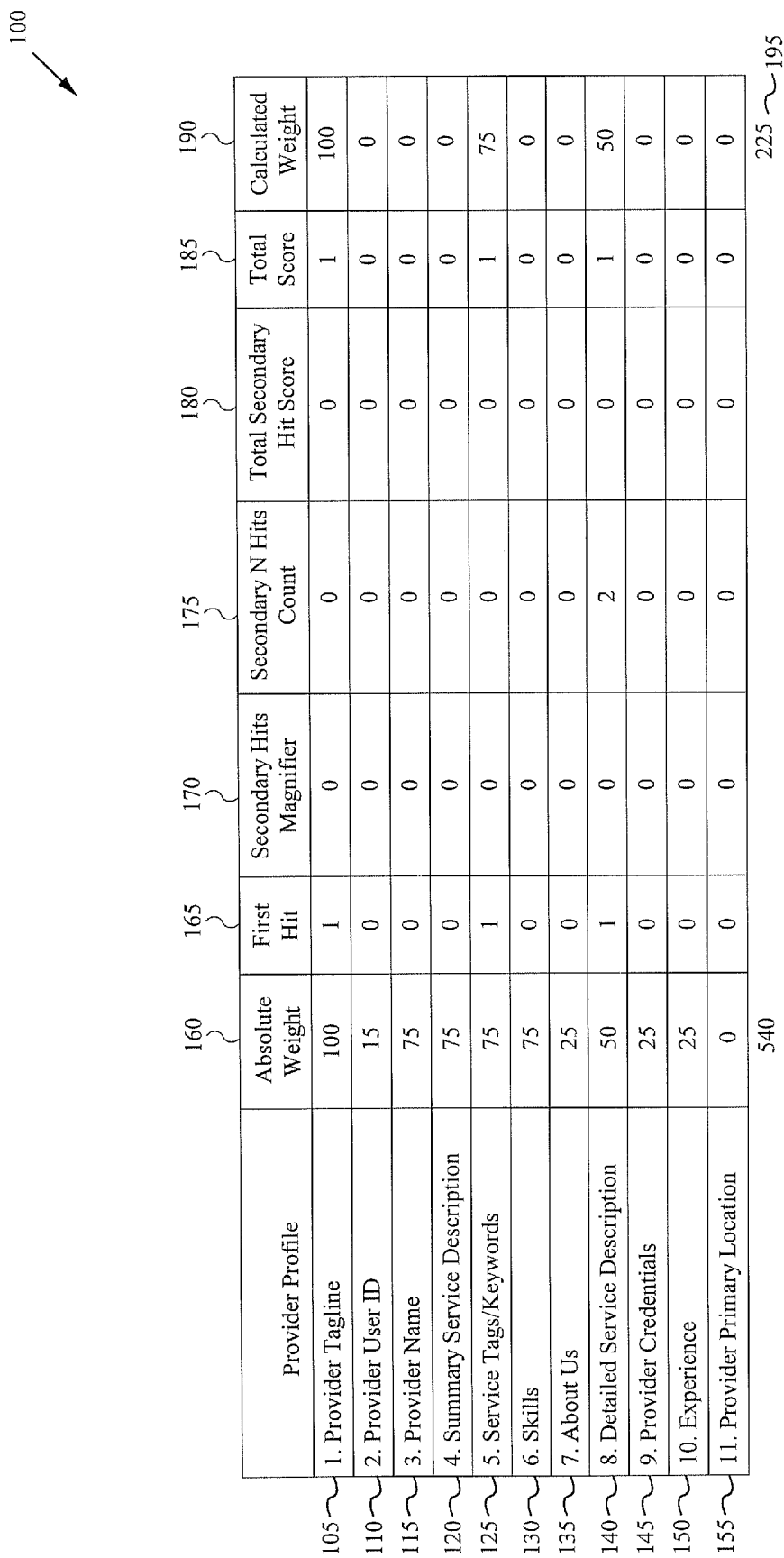
FIG. 1 illustrates a table of exemplary sections of a profile in accordance with some embodiments of the present invention.

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein or with equivalent alternatives.

Reference will now be made in detail to implementations of the present invention as illustrated in the accompanying drawings. The same reference indicators will be used throughout the drawings and the following detailed description to refer to the same or like parts.

Embodiments of the present invention are directed to a buyer-provider matching algorithm within a services exchange medium. Preferably, in a services exchange medium, buyers are able to post projects and to search and hire service providers "on demand" to get the projects done quickly and cost effectively. In the services exchange medium, a service provider creates a profile in order to be immediately connected to a buyer looking for the service provider's expertise. Typically, the service provider's profile describes the service provider's professional abilities. The buyer is able to review the service provider's profile to make an instant hiring decision.

The buyer-provider matching algorithm in some embodiments calculates a "Provider Search" score for each service provider within the services exchange medium. A provide results list generated from a provider search is sorted by the "Provider Search" score. In some embodiments, the buyer-provider matching algorithm preferably uses two scores to calculate the "Provider Search" score: a "Reputation" score and a "Provider Match" score. Each, in turn, is described below.

The "Reputation" score is a quantitative metric which represents the service provider's reputation within the services exchange medium. In some embodiments, the "Reputation" score is dependent on factors such as customer satisfaction, earnings, and/or participation by the service provider within the services exchange medium. Other factors are possible. The "Reputation" score typically ranges from 0% to 100%. If the service provider's "Reputation" score is 11%, then the service provider's reputation is better than 11% of other service providers within the services exchange medium. If the service provider's "Reputation" score is 100%, then the service provider's reputation is better than all other service providers within the services exchange medium. In other embodiments, the "Reputation" score is configured to enhance the "Provider Match" score.

As mentioned above, the buyer-provider matching algorithm also uses the "Provider Match" score to calculate the "Provider Search" score. In some embodiments, if a search text is entered as part of the provider search, then the search text is compared against the service provider's profile and against past projects completed by the service provider within the services exchange medium. In this discussion, assume that the search text is "php."

FIG. 1 illustrates a table 100 of exemplary sections of a profile in accordance with the present invention. In some embodiments, the "php" search text is compared against different sections of the profile. Each section is associated with an absolute weight, which is variable and adjustable. The absolute weight typically ranges from 0 to 100. In some embodiments, the absolute weight are determined by the services exchange medium. As shown in an "Absolute Weight" column 160, a "Provider Tagline" section 105 has an absolute weight of 100, a "Provider User ID" section 110 has an absolute weight of 15, a "Provider Name" section 115 has an absolute weight of 75, a "Summary Service Description" section 120 has an absolute weight of 75, a "Service Tags/Keywords" section 125 has an absolute weight of 75, a "Skills" section 130 has an absolute weight of 75, an "About Us" (e.g. introduction) section 135 has an absolute weight of 25, a "Detailed Service Description" section 140 has an absolute weight of 50, a "Provider Credentials" section 145 has an absolute weight of 25, an "Experience" section 150 has an absolute weight of 25, and a "Provider Primary Location" section 155 has an absolute weight of 0.

Other sections of the profile and absolute weights that make up the "Provider Match" score are possible. In some embodiments, a distinction is made between certified skills and uncertified skills. Certified skills typically have a higher absolute weight than uncertified skills.

A "First Hit" column 165 indicates whether a match between the "php" search text and a corresponding section of the profile has occurred during the provider search. Specifically, once the "php" search text is found in that section, a first hit for that section is a one; otherwise, if the section does not contain the "php" search text, then the first hit for that section remains a zero. As illustrated in FIG. 1, a first hit for the "Provider Tagline" 105 is a one, a first hit for the "Service Tags/Keywords" section 125 is a one, and a first hit for the "Detailed Service Description" 140 is a one, because the "php" search text is found in those section. In some embodiments, each section also has a secondary hit magnifier shown in a "Secondary Hits Magnifier" column 170. The secondary hit magnifier, which is variable and adjustable, is used to increase the service provider's "Provider Match" score when the "php" search text is found more than once in that corresponding section. Specifically, a number of secondary hits for that section, shown in a "Secondary N Hits Count" column 175, is multiplied with that section's secondary hits magnifier to get a total secondary hit score, shown in a "Total Secondary Hit Score" column 180. In some embodiments, the secondary hits magnifier values are determined by the services exchange medium.

As illustrated in FIG. 1, the secondary hits magnifier for each section is set to zero, although the secondary hit magnifier values for the sections are able to be set to any and/or different values. As such, regardless how often the "php" search text appears in, for example, the "Detailed Service Description" section 140 more than once, the corresponding total secondary hit score is zero. A total score for each section, shown in a "Total Score" column 185, is determined by adding together the corresponding total secondary hit score and the first hit. The total score for each section is then multiplied with the corresponding absolute weight to determine a calculated weight, shown in a "Calculated Weight" column 190. A total calculated weight 195 is determined by adding together the calculated weight for each section. The total calculated weight 195 is 225. It should be apparent that the table values as illustrated are exemplary only and do not limit the scope of the invention.

In some embodiments, the "php" search text is also compared against past projects completed by the service provider within the services exchange medium. Specifically, the "php" search text is compared against project names of X most recently completed projects within the services exchange medium in the past Z months. And, the "php" search text is compared against project descriptions of Y most recently completed projects within the services exchange medium in the past Z months. Typically, a value of X is 20, a value of Y is 10, and a value of Z is six. Other values of X, Y and Z are possible.

Figure 2:
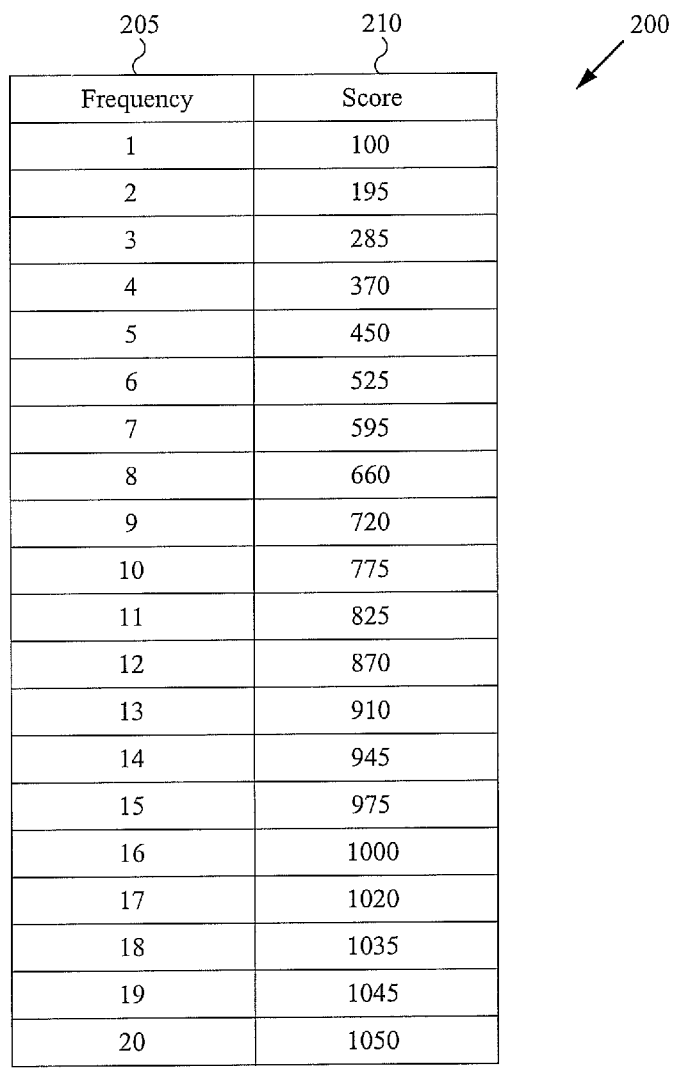
FIG. 2 illustrates a table of project name match frequencies and corresponding score values in accordance with some embodiments of the present invention.

FIG. 2 illustrates a table 200 of project name match frequencies and corresponding scores in accordance with the present invention. The project name match frequencies are shown in a "Frequencies" column 205, and the corresponding scores are shown in a "Score" column 210. The more project name matches that occur during the provider search, a higher score is added to the service provider's "Provider Match" score. For example, the service provider is awarded with a score of 100 if the service provider, within the last six months, has completed one project having the "php" search text as part of the project name. The service provider is awarded a maximum score of 1050 if the service provider, within the last six months, has completed at least 20 projects having the "php" search text as part of the project names. The project name match frequencies and corresponding scores are variable and adjustable. Other project name match frequencies and corresponding scores that make up the "Provider Match" score are possible.

Figure 3:
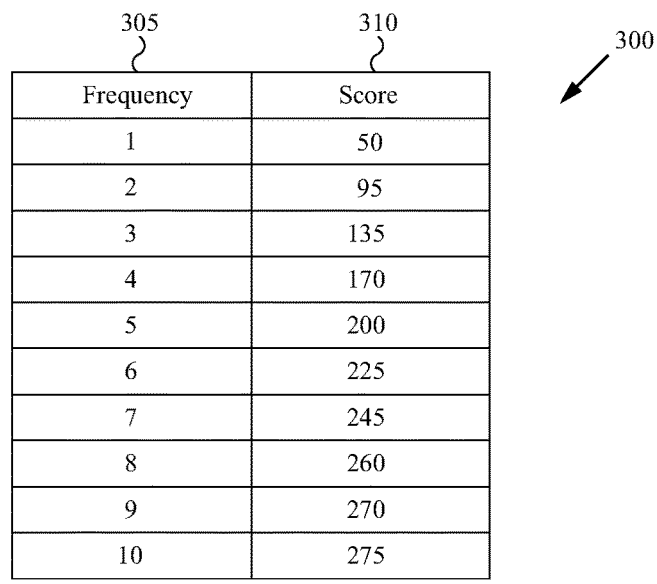
FIG. 3 illustrates a table of project description match frequencies and corresponding score values in accordance with some embodiments of the present invention.

FIG. 3 illustrates a table 300 of project description match frequencies and corresponding scores in accordance with the present invention. The project description match frequencies are shown in a "Frequencies" column 305, and the corresponding scores are shown in a "Score" column 310. The more project description matches that occur during the provider search, a higher score is added to the service provider's "Provider Match" score. For example, the service provider is awarded with a score of 50 if the service provider, within the last six months, has completed one project having the "php" search text as part of the project description. The service provider is awarded a maximum score of 275 if the service provider, within the last six months, has completed at least 10 projects having the "php" search text as part of the project descriptions. The project description match frequencies and corresponding scores are variable and adjustable. Other project description match frequencies and corresponding scores that make up the "Provider Match" score are possible.

Figure 4:
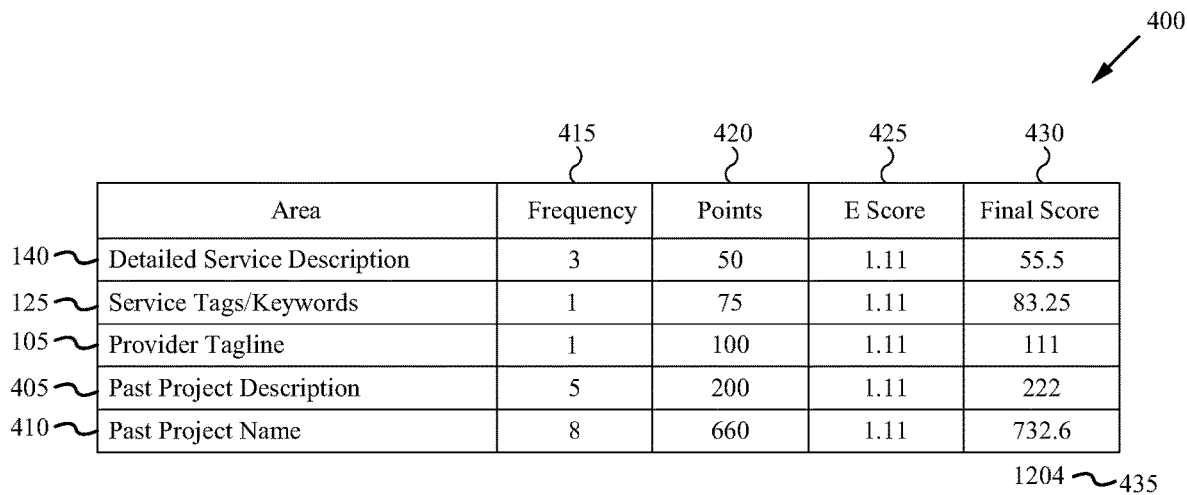
FIG. 4 illustrates a table of steps to derive a Provider Match score in accordance with some embodiments of the present invention.

FIG. 4 illustrates a table 400 of steps to derive the "Provider Match" score in accordance with the present invention. For example, assume that the service provider's "Reputation" score is 11%. Since the "Reputation" score is used to enhance the "Provider Match" score, an "E Score" multiplier 425 is 1.11. However, if the service provider had a perfect "Reputation" score of 100%, then the "E Score" multiplier 425 is 2, which is in some embodiments the maximum multiplier.

As illustrated in FIG. 4, the "php" search text is found in the following areas: three times in the "Detailed Service Description" section 140 of the profile, one time in the "Service Tags/Keywords" section 125 of the profile, one time in the "Provider Tagline" section 105 of the profile, five times in project descriptions 405 of projects completed within the past six months, and eight times in project names 410 of the projects completed within the past six months. As such, points 420 received for the "Detailed Service Description," the "Service Tags/Keywords," the "Provider Tagline," the "Past Project Description," and the "Past Project Name" are 50, 75, 100, 200, and 660, respectively. The points 420 are based on the frequencies 415 of the "php" search text found in each of the different areas, referencing the "Calculated Weight" column 190 of FIG. 1, and the "Score" columns 210 and 310 of FIGS. 2-3, respectively. Each of the points 420 received is multiplied with the "E Score" multiplier 425 (e.g. 1.11). As such, the "Reputation" score is configured to enhance the "Provider Match" score. Final scores 430 received for the "Detailed Service Description," the "Service Tags/Keywords," the "Provider Tagline," the "Past Project Description," and the "Past Project Name" are 55.5, 83.25, 111, 222, and 732.6, respectively. A total final score 435 is determined by adding together the final score for each area. The total final score 435 is 1204 (rounded from 1204.35). In some embodiments, the total final score 435 is the "Provider Search" score.

As mentioned above, the provider results list is sorted by the "Provider Search" score. Since reputation is an important attribute when searching for a qualified service provider, the "Provider Search" score takes into consideration the "Reputation" score. As such, the provider results list is advantageously sorted in a significant manner useful to the buyer searching for a qualified service provider. In some embodiments, the "Provider Search" score also takes into the service provider's performance within the services exchange medium.

Figure 5:
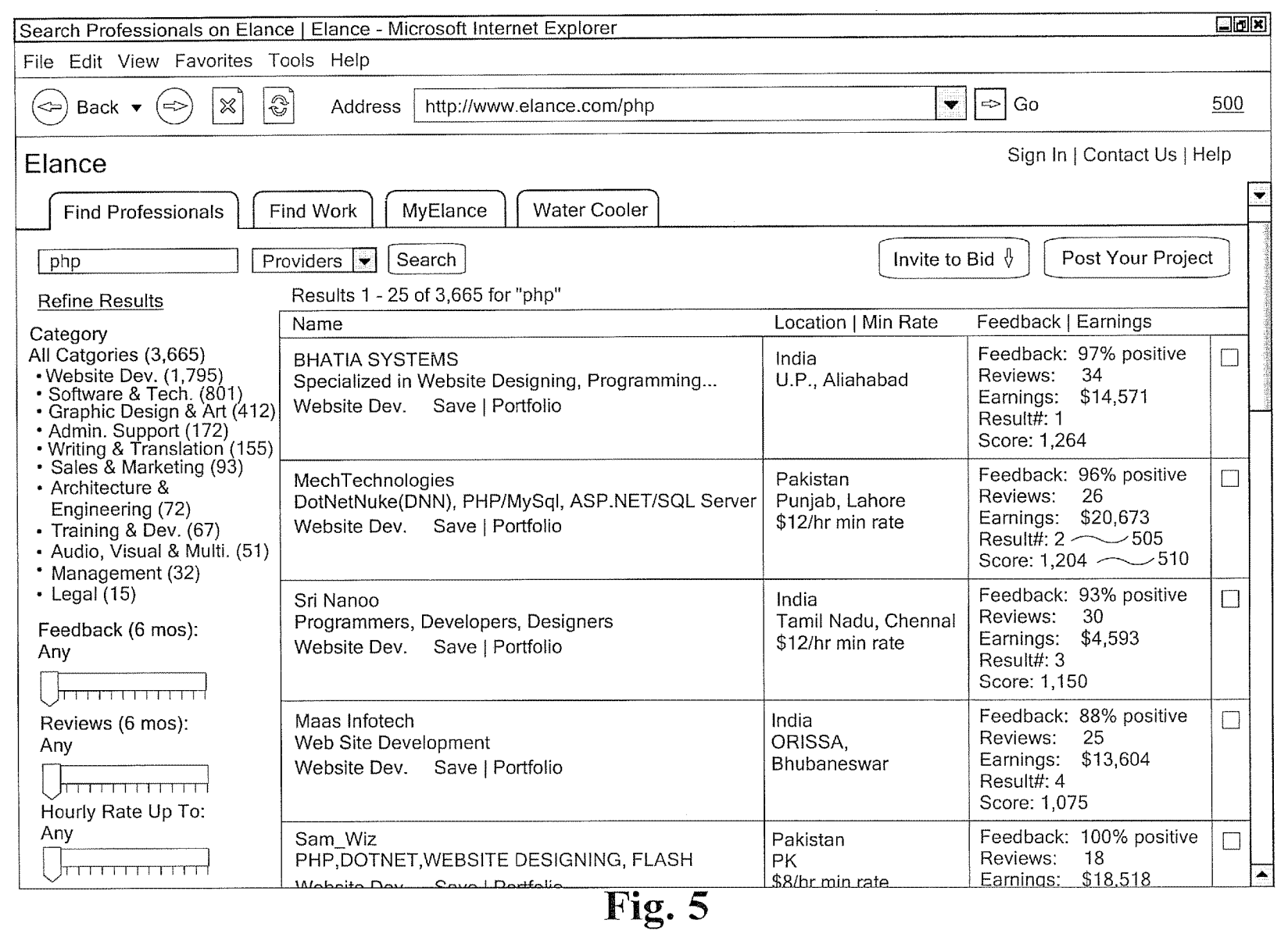

FIG. 5 illustrates an exemplary provider results list 500 in accordance with the present invention. In some embodiments, the provider results list 500 is sorted by the "Provider Search" score. As illustrated in FIG. 5, the service provider with the "Provider Search" score of 1204, as calculated above, is MechTechnologies. Bhatia Systems ranks higher than MechTechnologies in the provider results list 500 because Bhatia System has a higher "Provider Search" score than MechTechnologies. Bhatia Systems has a "Provider Search" score of 1, 264. In other embodiments, result rankings 505 and "Provider Search" scores 510 are not shown in the provider results list 500. Yet, in other embodiments, if no search text is entered as part of the provider search, then the "Reputation" score of each service provider is the final determiner of rank. As such, the provider results list 500 is sorted by the "Reputation" score.

Figure 6:
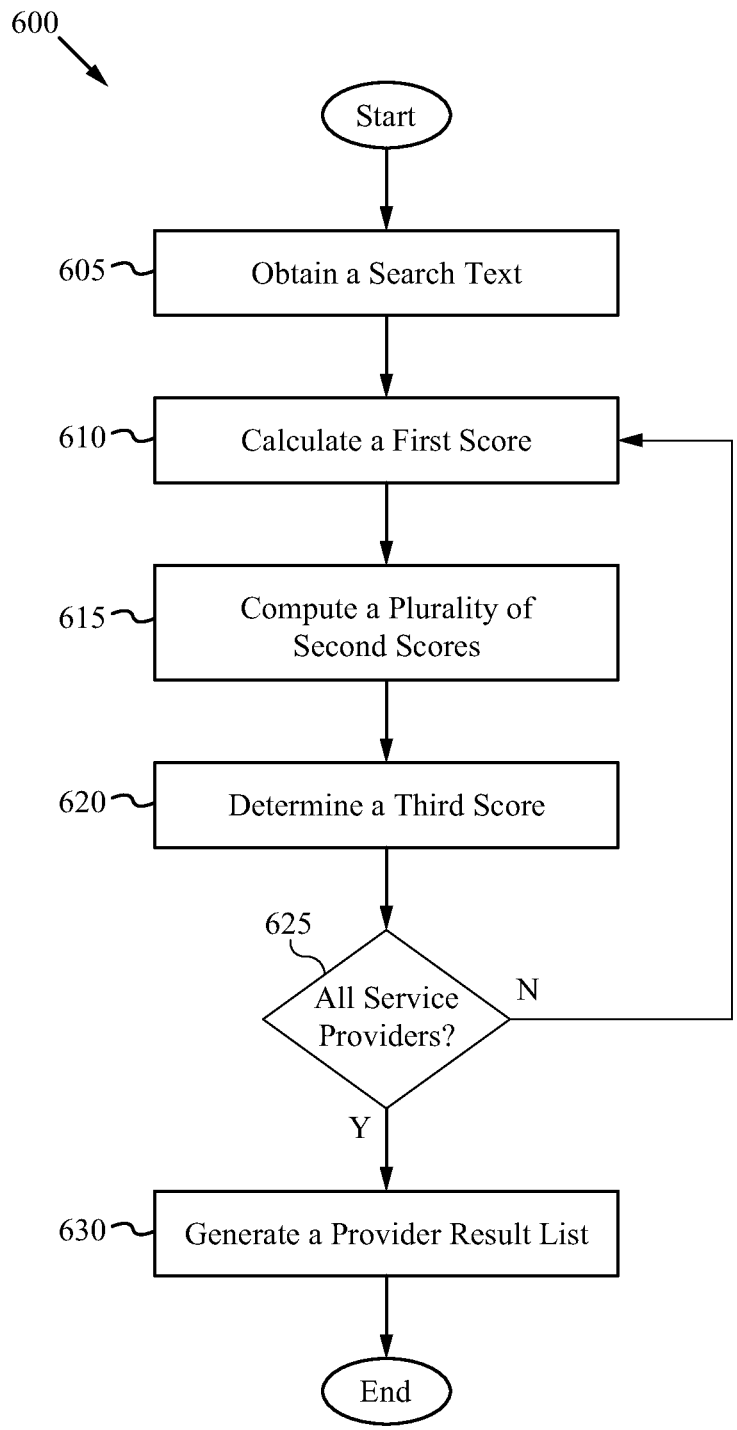
FIG. 6 illustrates a method of providing the returned provider results list in accordance with some embodiments of the present invention.

FIG. 6 illustrates a process 600 of providing the provider results list in accordance with the present invention. At step 605, the buyer-provider matching algorithm obtains a search text (e.g. "php") entered by a user. At step 610, the buyer-provider matching algorithm calculates a first score for a service provider within the services exchange medium. Typically, the first score is the "Reputation" score described above. At step 615, the buyer-provider matching algorithm computes a plurality of second scores. Typically, the plurality of second scores is computed by comparing the search text with the service provider's profile and with the past projects completed by the service provider within the services exchange medium. The plurality of second scores is the "Provider Match" score described score. At step 620, the buyer-provider matching algorithm determines a third score. Typically, the third score is derived by using the first score and the plurality of second scores. The third score is the "Provider Search" score described above. Step 625 determines whether a third score has been determined for each service provider within the services exchange medium. If a third score has been determined for each service provider within the services exchange medium, then at step 630, a provider results list is generated and is sorted by the third score. The process 600 ends. Alternatively, a first score is calculated for another service provider at step 610 and the process 600 continues.

The steps of the present invention are embodied in machine-executable instructions. These instructions can be used to cause a general-purpose or special-purpose processor that is programmed with the instructions to perform the steps of the present invention. Alternatively, the steps of the present invention can be performed by specific hardware components that contain hardwired logic for performing the steps, or by any combination of programmed computer components and custom hardware components.

Figure 7:
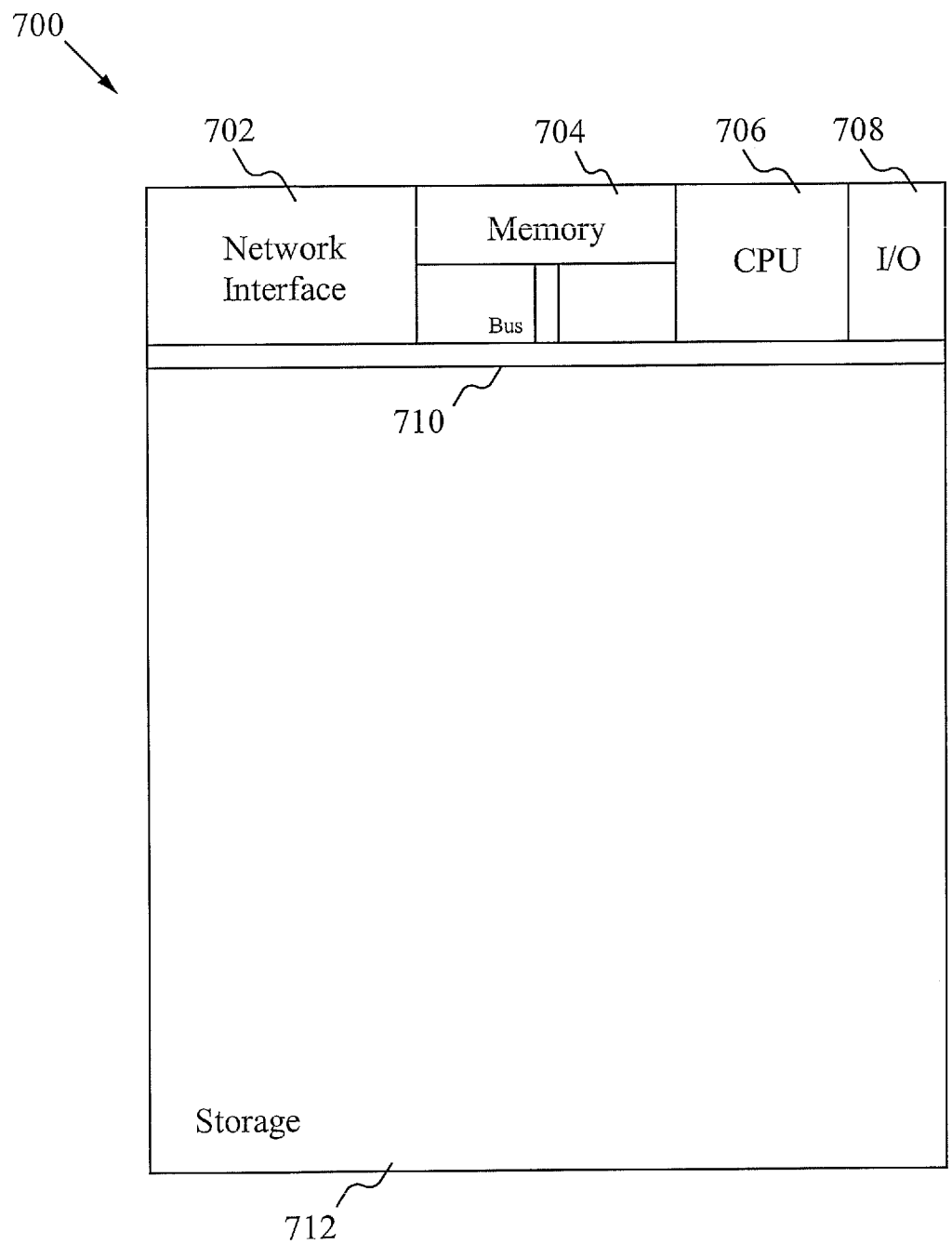
FIG. 7 illustrates a graphical representation of an exemplary computing device in accordance with some embodiments of the present invention.

In some embodiments, the present invention is provided as a computing device. FIG. 7 illustrates a graphical representation of an exemplary computing device 700 in accordance with the present invention. The computing device 700, such as a server stores, serves, computes, communicates, generates and/or displays information about the service provider within the services exchange medium. The service provider uses an Internet-ready device, such as a personal computer, to interact with the computer device 700 to create the profile and to generate the online professional badge. In general, a hardware structure suitable for implementing the computing device 700 includes a network interface 702, a memory 704, processor 706, I/O device(s) 708, a bus 710 and a storage device 712. The choice of processor is not critical as long as the processor 706 has sufficient speed. The memory 704 is any conventional computer memory known in the art. The storage device 712 is a hard drive, CDROM, CDRW, DVD, DVDRW, flash memory card or any other storage device. The computing device is able to include one or more network interfaces 702. An example of a network interface includes a network card connected to an Ethernet or other type of LAN. The I/O device(s) 708 are able to include one or more of the following: keyboard, mouse, monitor, display, printer, modem and other devices. Software used to create the online professional badge is likely to be stored in the storage device 712 and memory 704 and processed as an application is typically processed.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to the buyer-provider matching algorithm will occur. Consequently, the claims should be broadly construed, consistent with the spirit and scope of the invention, and should not be limited to their exact, literal meaning.

We claim:

1. A non-transitory computer-readable medium storing instructions that, when executed by a computing device, cause the computing device to perform a method comprising:

obtaining a timeframe, specified by a buyer, that includes a number of months relative to a current time;

communicatively coupling with at least one data store that together stores service provider profiles and projects completed by services providers within a services exchange medium;

assessing a services exchange medium reputation score for each service provider in the services exchange medium;

based on a determination that a search text has been specified by the buyer, for each service provider profile stored in the at least one data store, calculating a provider search score for a respective service provider profile, wherein the provider match score is based upon a match between the search text entered by the buyer and a section of the respective service provider profile, wherein the respective service provider profile comprises multiple sections entered by the service provider associated with the respective service provider profile, wherein the section of the respective service provider profile is weighted according to conditions established by the services exchange medium to contribute to the provider match score upon match between the section and the search text, wherein the provider match score as a first hit value is further modified according to one or more total secondary hit scores of subsequent matches of the section and the search text in response to the established weighting conditions, wherein a sum of the first hit value and the total secondary hit score determines a participation in a calculation of an associated section of the respective service provider profile and wherein the provider search score is also based upon a match between the search text entered by the buyer and a part of each project that is completed by the service provider associated with the respective service provider profile and within the timeframe specified by the buyer; and adjusting the provider search score by the services exchange medium reputation score of the service provider associated with the respective service provider profile; and sorting a provider results list based on adjusted provider search scores;

based on a determination that a search text has not been specified by the buyer, sorting the provider results list based on the services exchange medium reputation score; and presenting the provider results lists in a user interface.

2. The non-transitory computer-readable medium of claim 1 wherein the services exchange medium reputation score is dependent on at least one of customer satisfaction, earnings, and participation by a service provider within the services exchange medium.

3. The non-transitory computer-readable medium of claim 1 wherein a number of points for the match between the search text and the section of the profile comprises the first hit value and the total secondary hit score.

4. The non-transitory computer-readable medium of claim 3 wherein the calculating comprises adjusting the total secondary hit score by a secondary hits magnifier.

5. The non-transitory computer-readable medium of claim 4 wherein the secondary hits magnifier is modifiable.

6. The non-transitory computer-readable medium of claim 4 wherein the calculating further comprises adding the first hit value and the total secondary hit score together, and multiplying an absolute weight to a sum of the first hit value and the total secondary hit score.

7. The non-transitory computer-readable medium of claim 6 wherein the absolute weight is modifiable.

8. The non-transitory computer-readable medium of claim 1 wherein the part of the project is a project name or a project description.

9. The non-transitory computer-readable medium of claim 8 wherein a number of points associated with a match between the search text and the project name is modifiable.

10. The non-transitory computer-readable medium of claim 8 wherein a number of points associated with a match between the search text and the project description is modifiable.

11. A computer readable storage medium tangibly embodied thereon a program of instructions executable by a processor for performing a method of searching service providers in a services exchange medium operable to connect a buyer and a service provider over a network, the method comprising:

obtaining a timeframe that includes a number of months relative to a current time;

accessing at least one data store that together includes service provider profiles of the service providers in the services exchange medium;

assessing a first score for each service provider in the services exchange medium, wherein the first score is dependent on services exchange medium reputation of that service provider;

based on a determination that a search text has been provided by a buyer, comparing the search text with the profile belonging to a service provider and stored in the at least one data store of the services exchange medium, wherein the profile comprises multiple sections entered by the service provider;

computing a plurality of second scores based on matches between the search text and the profile belonging to the service provider, wherein each section of the profile is weighted according to conditions established by the services exchange medium to contribute to the second scores upon match between a respective section and the search text, wherein the second scores are further modified according to one or more subsequent match score of subsequent matches of the respective section and the search text in response to the established weighting conditions, wherein a sum of the second score and the subsequent match score determines a participation in a calculation of an associated section of the respective section on the service provider profile;

computing a plurality of third scores based on matches between the search text and parts of each project that is completed by the service provider within the services exchange medium and within the timeframe specified by the buyer;

determining a fourth score based on the plurality of second scores and the plurality of third scores that together are enhanced by the first score;

repeating steps of comparing to determining for all service providers within the services exchange medium; and generating a provider results list that is sorted by the fourth score; and based on a determination that a search text has not been provided by a buyer, generating a provider results list that is sorted by the first score.

12. The computer readable storage medium of claim 11 wherein the services exchange medium reputation is dependent on at least one of customer satisfaction, earnings, and participation by the service provider within the services exchange medium.

13. The computer readable storage medium of claim 11 wherein the sections include provider tagline section, a provider user ID section, a provider name section, a summary services description section, a keywords section, a skills section, an about us section, a detailed services exchange section, a credentials section, and an experience section.

14. The computer readable storage medium of claim 11 wherein the parts include a project name and a project description.

15. The computer readable storage medium of claim 11 wherein a number of points for a match between the search text and a section of the profile comprises a first hit value and a total secondary hit score.

16. The computer readable storage medium of claim 15 wherein the comparing comprises adjusting the total secondary hit score by a secondary hits magnifier.

17. The computer readable storage medium of claim 16 wherein the secondary hits magnifier is modifiable.

18. The computer readable storage medium of claim 16 wherein the comparing further comprises adding the first hit score and the total secondary hit score together, and multiplying an absolute weight to a sum of the first hit value and the total secondary hit score.

19. The computer readable storage medium of claim 18 wherein the absolute weight is modifiable.

20. The computer readable storage medium of claim 14 wherein a number of points for a match frequency between the search text and the project name is modifiable.

21. The computer readable storage medium of claim 14 wherein a number of points for a match frequency between the search text and the project description is modifiable.

22. A system for generating a provider results list comprising:
a processor; and
an application executed by the processor, the application for:
obtaining a timeframe that includes a number of months relative to a current time;
accessing at least one data store that together stores profiles of service providers of a services exchange medium that is operable to connect buyers with the service providers over a network;
assessing, for each service provider, a reputation score that is dependent on reputation of that service provider within the services exchange medium;
based on a determination that a search text has been specified by a buyer,
calculating a provider search score for each of the service providers within the services exchange medium, wherein the provider search score is a sum of at least one provider match score, wherein each of the at least one provider match score is based on a match between the search text entered by the buyer and a section of the service provider profile for the respective service provider or is based on a match between the search text entered by the buyer and a part of each project that is completed by the service provider within the services exchange medium and within the timeframe, wherein the service provider profile comprises multiple sections entered by the respective service provider, wherein the section of the profile is weighted according to conditions established by the services exchange medium to contribute to the provider match score upon match between the section and the search text, wherein the provider match score is further modified according to one or more subsequent match scores of subsequent matches of the section and the search text in response to the established weighting conditions, wherein a sum of the provider match score and the subsequent match score determines a calculation participation of an associated section of the respective section on the service provider profile, wherein the sum of the at least one provider match score is enhanced by the reputation score; and
sorting the provider results list based on the provider search score;
based on a determination that a search text has not been specified by the buyer, sorting the provider results list based on the reputation score; and
generating a user interface that includes the sorted provider results list.

23. The system of claim 22 wherein the application is executed online.

24. The system of claim 22 wherein the reputation score is dependent on at least one of customer satisfaction, earnings, and participation by a service provider within the services exchange medium.

25. The system of claim 22 wherein the section of the profile is a provider tagline section, a provider user ID section, a provider name section, a summary services description section, a keywords section, a skills section, an about us section, a detailed services exchange section, a credentials section, or an experience section.

26. The system of claim 22 wherein a number of points for a match between the search text and the section of the profile comprises a first hit value and a total secondary hit score.

27. The system of claim 26 wherein the calculating comprises adjusting the total secondary hit score by a secondary hits magnifier.

28. The system of claim 27 wherein the secondary hits magnifier is modifiable.

29. The system of claim 27 wherein the calculating further comprises adding the first hit value and the total secondary hit score together, and multiplying an absolute weight to a sum of the first hit value and the total secondary hit score.

30. The system of claim 29 wherein the absolute weight is modifiable.

31. The system of claim 22 wherein the part of the project is a project name or a project description.

32. The system of claim 31 wherein a number of points associated with a match between the search text and the project name is modifiable.

33. The system of claim 31 wherein a number of points associated with a match between the search text and the project description is modifiable.

34. A computer-implemented method of enhancing provider match scores comprising:
obtaining a timeframe that includes a number of months relative to a current time;
accessing at least one data store that together stores a profile entered by a service provider of a services exchange medium operable to connect a buyer and the service provider over a network;
assessing an enhancement value that is dependent on reputation of the service provider within the services exchange medium;
based on a determination that a search text has been specified by the buyer,
determining a first match score based on a match between the search text and a section of the profile, wherein the section of the profile is weighted to contribute to the first match score according to conditions established by the services exchange medium, wherein the first match score is further modified according to one or more second match scores of subsequent matches in response to the established weighting conditions, wherein a sum of the first match score and the one or more second match scores determines a calculation participation of an associated section of the profile, wherein the established weighting conditions includes a magnifier associated with the one or more subsequent matches, by a computer programmed with instructions for determining the first match score;
determining a second match score based on a number of matches between the search text and a project title of each project completed by a service provider within the services exchange medium and within the timeframe specified by the buyer, by a computer programmed with instructions for determining the second match score;

determining a third match score based on a number of matches between the search text and a project description of each project completed by the service provider within the services exchange medium and within the timeframe specified by the buyer, by a computer programmed with instructions for determining the third match score;

adding together first match scores, the second match score, and the third match score to obtain a total match score, by a computer programmed with instructions for obtaining the total match score;

multiplying the enhancement value to the total match score to obtain a search value, by a computer programmed to multiply the enhancement value to the total match score; and determining a position of the service provider relative to other service providers in the services exchange medium based on the search value; and based on a determination that a search text has not been specified by the buyer, determining a position of the service provider relative to other service providers in the services exchange medium based on the enhancement value.

35. The system of claim 22 wherein the timeframe is specified by the buyer.

36. The system of claim 35 wherein the timeframe is specified via the user interface.

* * * * *